Feb. 23, 1937.    J. FECHTNER    2,071,738
BEET TOPPING MACHINE
Filed Aug. 8, 1936    5 Sheets-Sheet 4

INVENTOR.
BY Josef Fechtner
Arlington Curtis
ATTORNEY.

Feb. 23, 1937.   J. FECHTNER   2,071,738
BEET TOPPING MACHINE
Filed Aug. 8, 1936   5 Sheets-Sheet 5
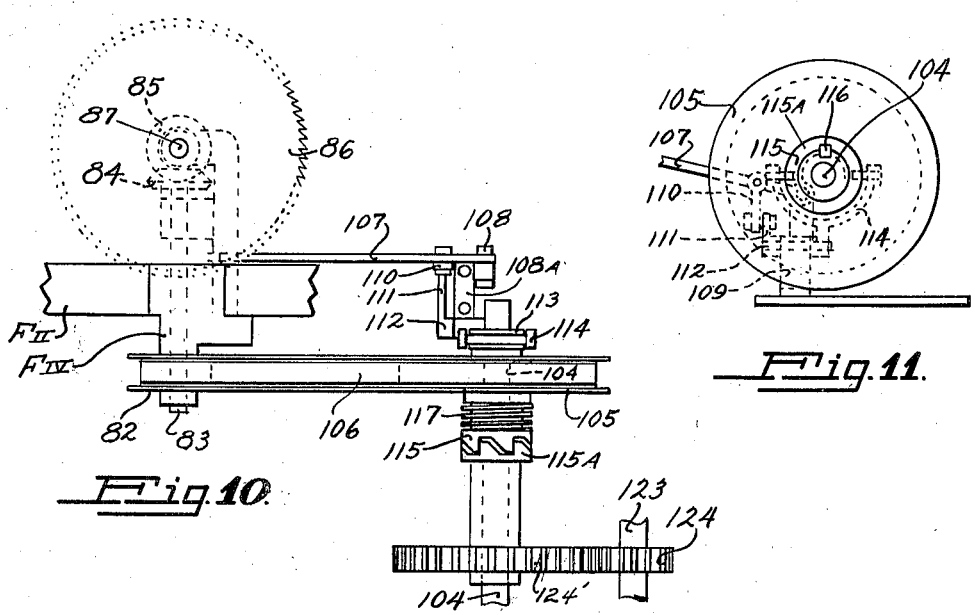
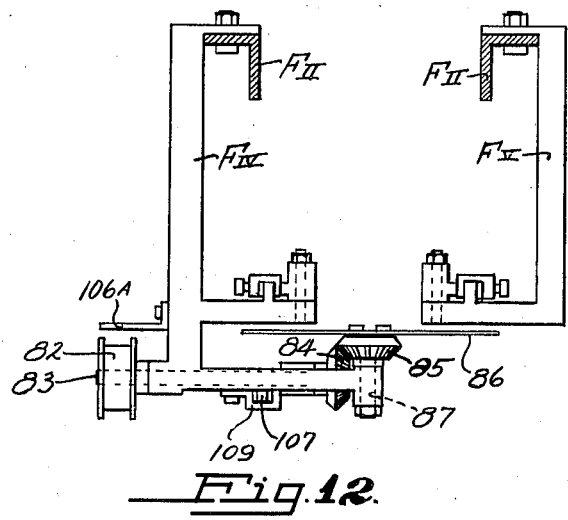
INVENTOR.
BY Josef Fechtner.
Arlington Curtis
ATTORNEY.

Patented Feb. 23, 1937

2,071,738

UNITED STATES PATENT OFFICE 2,071,738

BEET TOPPING MACHINE

Josef Fechtner, Berkeley, Calif.

Application August 8, 1936, Serial No. 94,971

3 Claims. (Cl. 55—108)

The invention, in general, relates to devices for harvesting crops and more particularly relates to a beet harvesting machine incorporating means for topping the beets during the harvesting and while the machine traverses a field thereof.

The invention forming the subject matter of this application constitutes an improvement over the machine disclosed and claimed in my co-pending application, now Patent 2,061,834, entitled "Beet harvesting machine". This application comprises a continuation-in-part of the foregoing application and the principal improvement comprises novel and useful topping mechanism. Other improvements over my prior apparatus likewise are hereinafter described and claimed.

The primary object of my improved invention is to provide beet topping mechanism which includes means for effectively positioning beets during the topping mechanism and for steadying the beet holding mechanism adjacent the cutter thereby increasing the efficiency of topping operations.

Another object of the invention is to provide means for enabling uniform topping of beets regardless of the variations in size of the beets and amounts of foliage carried by the beets.

A still further object of the invention is to provide improved mounting means for the beet lifters and the working units of the machine to afford greater clearance of the same from other parts and from the ground when the beet conveying and topping elements are shifted to a non-working position.

Other objects of the invention, together with some of the advantageous features thereof, will appear from the following description of a preferred embodiment of the improvement which is illustrated in the accompanying drawings.

Referring to the drawings:

Figure 8 is a front elevation of mounting means for the elements for driving the beet elevator.

Figure 9 is a side elevation of the elements shown in Figure 8.

Figure 10 is a plan view of the beet cutter and alternate driving mechanism therefor.

Figure 11 is a side elevation of a portion of the mechanism shown in Figure 10.

Figure 12 is an enlarged detail showing the mounting of the beet cutter or topper and the drive mechanism therefor.

In its preferred form, the beet topping machine of my present improvement preferably comprises a vehicle adapted to advance over a field of beets, a movable frame on said vehicle adapted to be lowered into and raised from a working position, means on said movable frame for severing and lifting the beets from the soil, means on said movable frame for conveying the severed beets rearwardly on the vehicle, together with topping mechanism on said movable frame, means operable in synchronism with said conveying means for positioning the beets and steadying the same for the topping operation and means for conveying the topped beets to a hopper on the vehicle for discharge therefrom during the advance of the vehicle over the field.

Figure 1:
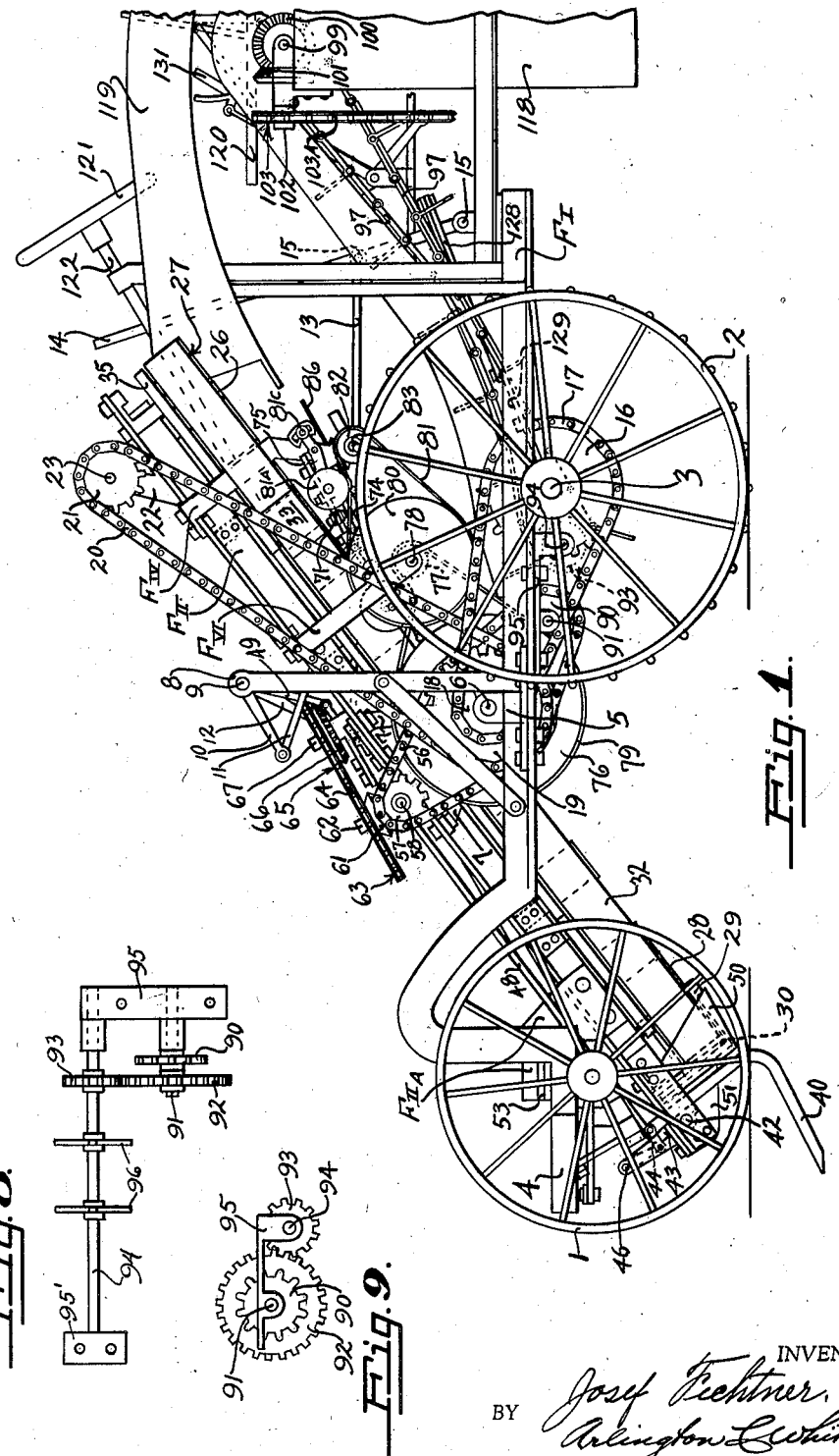
Figure 1 is a side elevation of the improved machine, except for the rear end thereof carrying the hopper and automatic mechanism for opening and closing the hopper doors for discharging topped beets. The latter mechanism is fully disclosed in my aforementioned co-pending application.

As illustrated in Figure 1 of the drawings, I provide a vehicle having a main frame F I which is supported by a pair of front ground engaging wheels 1 and a pair of rear ground engaging wheels 2, the latter being journaled on a rear axle 3 and the front wheels being journaled on a front axle 4. The main frame F I in turn supports a superstructure consisting of a movable frame F II together with additional or auxiliary frames F III to F VI inclusive.

Figure 4:
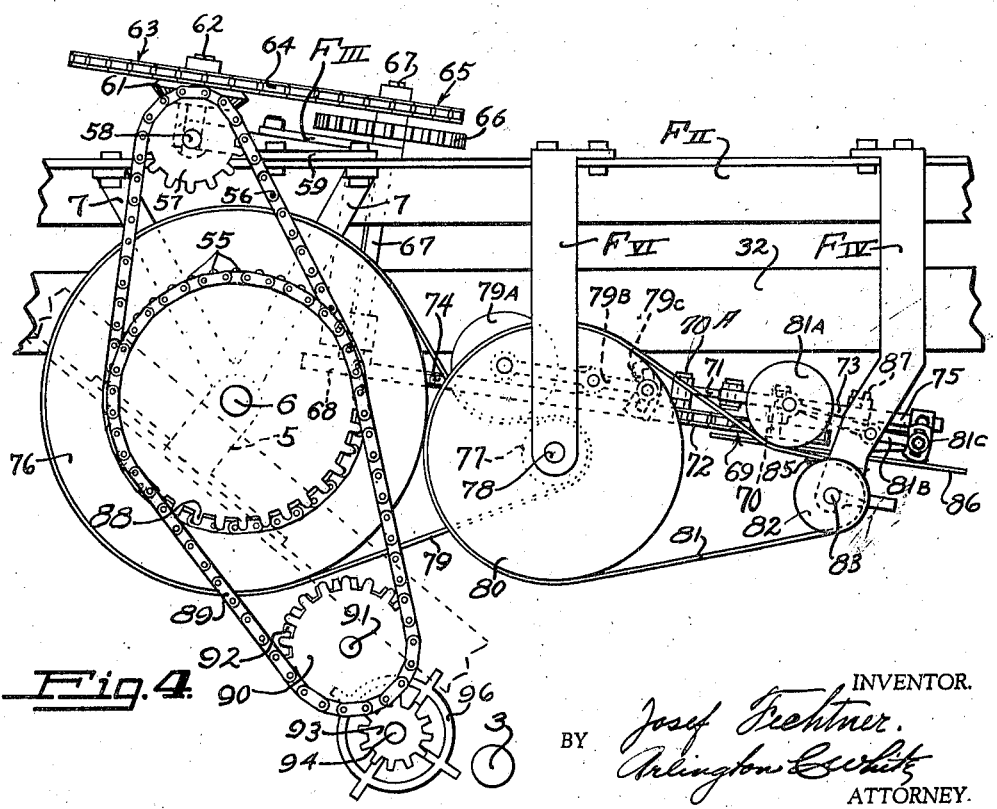
Figure 4 is a side elevation of the mechanism shown in Figure 3 and also on an enlarged scale.

The frame F II of the machine is movably mounted upon frame F I and to this end I provide a pair of brackets 5, 5' which are secured to opposite sides of frame F I and in which rods 6 and 6' are journaled. Mounted on rods or pins 6 and 6' are a pair of V-shaped supports 7 and 7' which are fastened to the underside of frame F II, see especially Figure 4 of the drawings. The front end of frame F II is adapted to be lowered into a working position, see Figure 1 of the drawings, for severing the beets from the soil and for lifting them onto the vehicle for the topping operation, and likewise is adapted to be raised from the working position to a non-working or road position. The movement of frame F II is effected by linkage controlled from the operator's seat of the vehicle. Preferably, I provide for this purpose a pair of uprights 8 and 8' on opposite sides of frame F I which support a transverse rod 9. Rod 9 is connected to frame F II by means of arms 10, 10' and links 11, 11'. An arm 12 on rod 9 is connected through a rod 13 to a hand lever 14 supported by means of a bracket on frame F I and pin 15 adjacent the operator's seat, near the rear of the vehicle. Throwing of the lever 14 effects a lowering and raising of movable frame F II through the connections and linkage just described.

Figure 2:
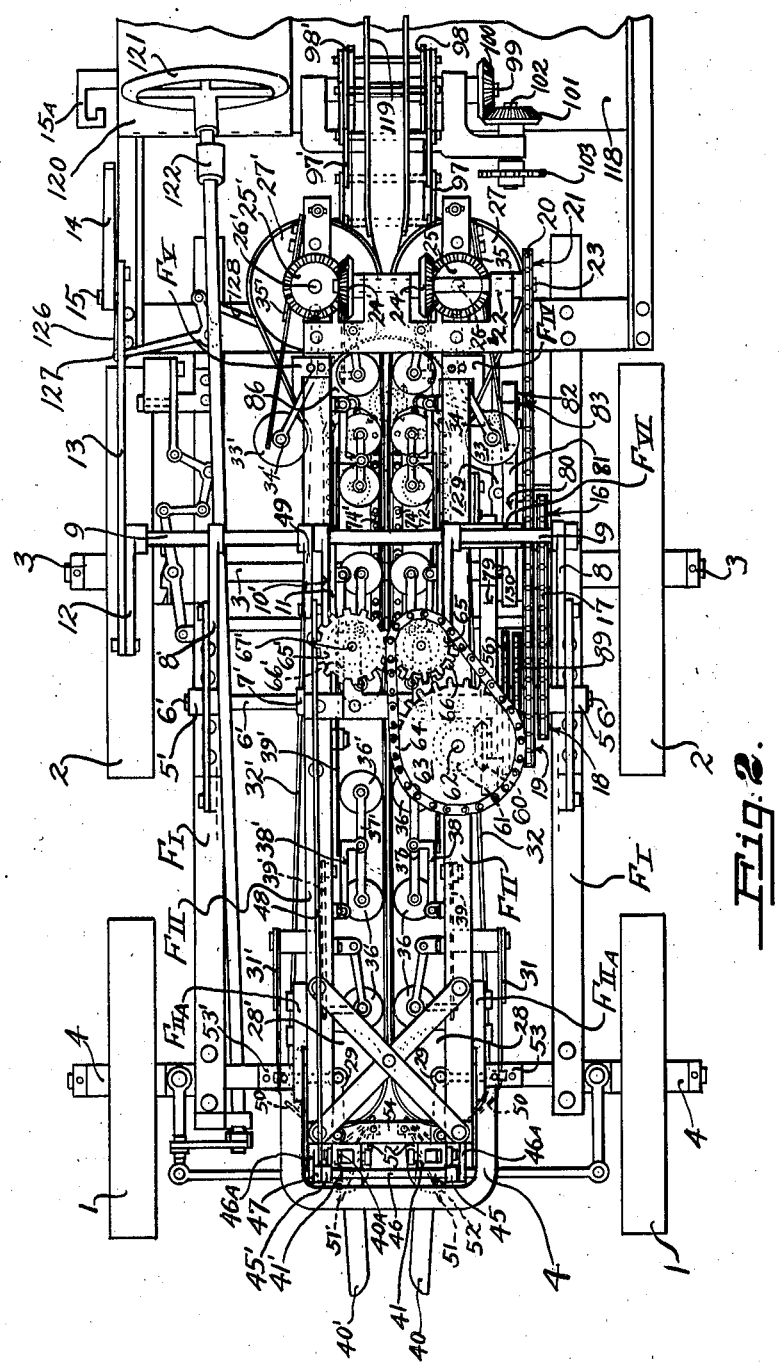
Figure 2 is a view looking into the face of the inclined frame F II and normal to such frame.
Figures 5, 6:
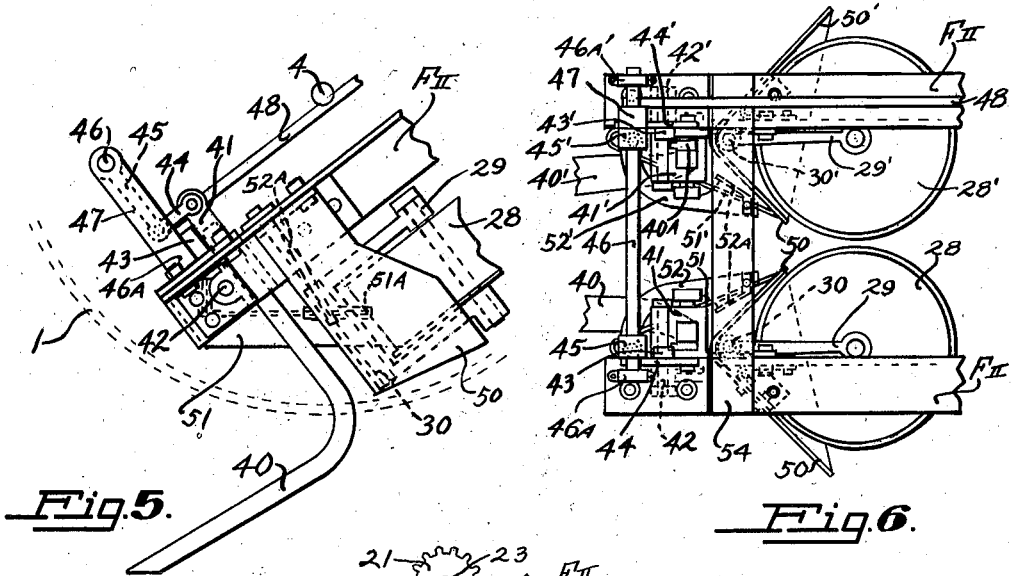
Figure 5 is an enlarged side elevation view of the front of the machine illustrating the mounting of the beet lifters and the belt shields.
Figure 6 is an enlarged plan view of the front of the movable frame F II of the machine and again illustrating the mounting of the beet lifters and belt shields.

In accordance with the invention, I provide mechanism for conveying the beets that have been loosened from the soil onto the machine rearwardly to the topping mechanism. The beet conveying mechanism may be driven by any suitable means but I preferably drive this mechanism from the rear axle of the vehicle. To this end, I provide a sprocket wheel 16 on the rear axle 3 and place such sprocket wheel in driving connection, by means of a chain 17 to a sprocket wheel 18 which is movably mounted on pin 6 journaled in bracket 5. A second sprocket wheel 19, also movably mounted on pin 6 is connected by means of a chain 20 to a sprocket wheel 21 which is mounted on a transverse shaft 23. The shaft 23 conveniently is journaled in bearings carried by brackets 22 on frame F II. Shaft 23 carries a pair of bevel gears 24, 24' which mesh with gears 25, 25' which are secured to pulley shafts 26, 26' respectively. The shafts 26, 26' conveniently are mounted in bearings carried in brackets 22. The shafts 26, 26' carry belt pulleys 27 and 27', respectively, which, together with pulleys 28 and 28' at the front end of the vehicle, serve as means for mounting the beet conveyor belts. The pulleys 28 and 28' are conveniently mounted on U-shaped pulley holders 29 and 29', respectively, which are secured by means of pins 30 and 30' to frame F II. See especially Figures 5 and 6 of the drawings. As illustrated in Figure 2, springs 31 and 31' are provided for engaging pulleys 28 and 28' respectively, to urge the pulleys toward each other. The pulleys 28, 28' are supported by U-shaped holders 29, 29' mounted on pins which are secured to frame F II. Belts 32, 32' for conveying the beets rearwardly are trained around pulleys 27, 28, 27', 28'. It will be observed that I also provide a pair of belt tightening pulleys 33, 33' which conveniently are supported by holders 34, 34' secured to frame F II and which are urged toward one another and against the outer runs of belts 32, 32' by springs 35, 35' which bear against the hubs of the pulley holders. Moreover, I provide a series of relatively small pulleys which are urged against the belts directly opposite one another so as to hold the beet tops effectively between the belts. These relatively small pulleys 36, 36' are supported by bars 37, 37' which in turn are carried by arms 38, 38' secured to frame F II. Resilient springs 39, 39' are provided for urging the pulleys toward one another, these springs bearing against the hubs of the pulley holders 37, 37'.

In accordance with the invention, a pair of plows or beet looseners and lifters 40, 40' are mounted on the front end of frame F II for loosening the beets during the advance of the vehicle and partially lifting the same onto the frame F II between the belts 32, 32' which grip the beet tops and lift them out of the ground. The preferred mounting of the lifters 40 and 40' is illustrated particularly in Figures 5 and 6 wherein it will be observed that I provide a pair of holders 41, 41' for the lifters, the holders being pivotally mounted on pins 42, 42' secured to frame F II. The holders 41, 41' support plates 40A which are removably inserted in the holders for laterally adjusting the lifters 40, 40'.

While the lifters 40, 40' are raised away from the ground when the frame F II is shifted to a non-working position, I have provided additional clearance means for swinging the lifters 40, 40' a greater distance from the ground to avoid possible contact therewith when the machine is being moved over uneven surfaces. To effect this result, I provide linkage between transverse rod 9, on uprights 8, 8', and the lifters which includes a pair of links 44, 44' which connect with arms on holders 41, 41' and with arms 45, 45' on transverse rod 46, the arm 47, also on rod 46, in turn being connected to rod 48 which is connected to arm 49 on transverse rod 9. The rod 46 conveniently is journaled in brackets 46A and 46A' secured to the frame F II. Consequently, movement of transverse rod 9 to lower the rear of frame F II and to raise the front thereof simultaneously effects movement of the transverse rod 46 and the above described connecting links to additionally raise the lifters 40, 40' away from the ground.

In order to avoid damages to the belts 32, 32' when the front end of frame F II is lowered to a working position and thus placing the belts near the ground, I have provided shields 50, 50' for the belts and fixedly secure them to frame F II in front of the U-shaped pulley holders. 29 so as to partially encompass the pulleys 28, 28' and belts 32, 32' thereon.

Means are provided for guiding the severed beets properly in between the belts 32, 32' and to avoid premature dropping of the beets at the front of the vehicle. These means include inclined side plates 51, 51' together with plates 52, 52' which are hingedly connected at the fronts thereof to side plates 51, 51' and slidable in slots 51A in the latter plates. The plates 51, 51' bear against the beet leaves to bend them inwardly toward the longitudinal medial line of the two belts 32, 32' and the plates or rods 52, 52' press downwardly on the beets so that beets standing too high are forced below the belts 32, 32'. Relatively light springs 52A are provided for urging the plates or rods 52, 52' lightly against the beet tops. These springs 52A conveniently are mounted on a transverse plate 54 secured to frame F II, see Figure 6 of the drawings, which plate serves to bend the beet leaves back so that the belts 32, 32' can grip a larger amount of the foliage and thus facilitate, by a pulling action, the removal of the beets from the soil. In addition to the foregoing elements at the front of frame F II, I provide plates 53, 53' which can be adjusted vertically for regulating the height of the front end of frame F II from the ground. I also provide hooks F IIA for holding the frame F II on the front axle of the machine.

Figure 3:
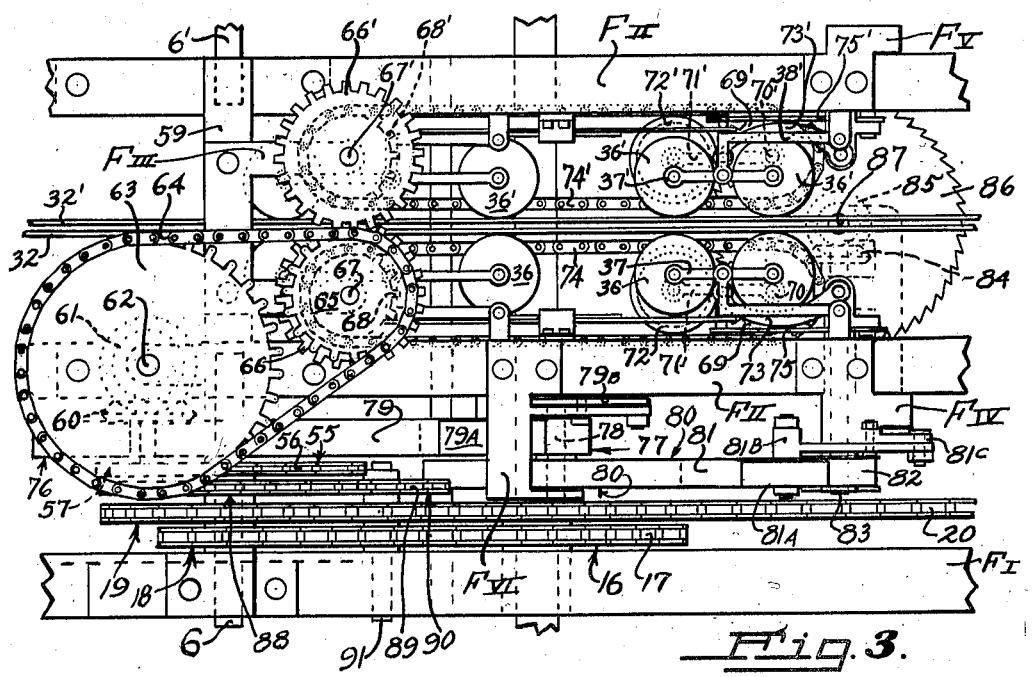
Figure 3 is an enlarged plan view of the beet conveying and beet topping mechanism of the machine, this view being taken on a plane looking into the frame F II and showing only a portion of the complete mechanism.

In accordance with my present improvement, I provide means operable in conjunction with the beet conveying mechanism for adjusting the positions of the beets as they approach the cutter or topping mechanism and for steadying the various topping and beet positioning elements during the topping operation. These means preferably are chain driven and include a sprocket wheel 55, movably mounted on pin 6, which is placed in driving connection by means of a chain 56 with a sprocket wheel 57 which is mounted on a shaft 58 journaled in bearings carried in a transverse plate 59 which is rigidly fastened to frame F II. See, in this connection, the enlarged showings of Figures 3 and 4. Shaft 58 carries a bevel gear 60 which meshes with bevel gear 61 secured to sprocket wheel 63 which can either be mounted on a pin 62 in an arm on transverse plate 59, or conveniently, on a shaft movably mounted in bearings on transverse plate 59. The sprocket wheel 63 is connected by means of a chain 64 to a sprocket wheel 65 which is secured to a gear wheel 66 on the upper end of a relatively long shaft 67 which is journaled in bearings carried by a frame F III secured to transverse plate 59. The gear wheel 66 meshes with a gear wheel 66' which is secured to a shaft 67' also journaled in the frame F III. Having in mind the foregoing described connections and gearing, it will be observed that the turning of sprocket wheel 55 on pin 6 effects turning of shafts 67 and 67'. It will also be noted that the frame F III extends downward from transverse plate 59 to provide additional bearings for the shafts 67 and 67'.

The foregoing elements comprise the driving mechanism for the means provided for positioning the beets for the topping operation. These last named means include a pair of sprocket wheels 68 and 68' mounted at the lower ends of shafts 67 and 67' respectively and at approximately right angles to the belts 32, 32'. The sprocket wheels 68, 68' are placed relatively close to the belts 32, 32' so that beets hanging close to the belts will come under the chains hereinafter described. The cutter or beet topper is rotatably supported at a distance below the belts 32, 32' to properly top normally low hanging beets. Adjacent the cutter I mount a pair of sprocket wheels 69, 69' on pins 70 and 70' respectively, which are journaled in one end of bars 71, 71' movably mounted on arms 73, 73' which, in turn, are pivotally mounted on frame F IV secured to frame F II. Chains 74, 74' are trained around sprocket wheels 68, 69 and 68', 69' respectively, and it is to be especially noted that the positioning of the sprocket wheels causes the chains 74, 74' to lead away from the belts 32, 32' as they approach the cutter. In other words, the chains 74, 74' are inclined relative to the belts 32, 32' due to the positioning of sprocket wheels 68, 68' relatively close to the belts at the forward end of the machine and the positioning of the sprocket wheels 69, 69' remote from and below the belts but relatively close to and just above the cutter. By this arrangement, as above stated, beets which hang close to the belts 32, 32' are gripped by the chains 74, 74' at the sprocket wheels 68, 68' and are brought down as they are conveyed rearwardly to position them all uniformly and at the same distance below the belts for the topping operation at the cutter which is mounted just below the wheels 69, 69'. The ratio between the several sets of gears for driving the belts 32, 32' and the chains 74, 74' is such that the speeds of these two conveyors are the same.

To aid in steadying the beets for the topping operation, I preferably mount a pair of rollers 72, 72' on pins 70A and 70A', respectively, which are mounted in the opposite ends of bars 71 from which the sprocket wheels 69, 69' are mounted. Rollers 72, 72' are smaller in diameter than sprocket wheels 69, 69' and carry flanges on their upper faces which closely overlie the tops of the chains 74, 74' and serve to hold the chains down against any possible lifting thereof by the belts in gripping the beet tops, thereby steadying the beets for the cutting or topping action.

In this embodiment of my improvement in beet toppers, I preferably employ a rotary cutter for topping the beets. For actuating the cutter, either chain or belt drive from the rear axle may be utilized or, if a motor drive is used for propelling the vehicle, the rotary cutter may be driven directly from the motor. The accompanying drawings show the drive for the cutter from the rear axle or, alternately from the motor. In driving the cutter from the rear axle, I movably mount a pulley 76 on the pin 6 and bolt the same to the sprocket wheel 18 and other sprocket wheels on the pin. A pulley 77 is fastened to a shaft 78 which is journaled in a frame F VI secured to and depending from frame F II. The pulleys 76 and 77 are connected by a belt 79 and conveniently, a belt tightener 79a is provided on an arm 79b which is secured to frame F VI. Likewise a locking device 79c is provided for regulating the position of the tightener pulley 79a. The shaft 78 drives a pulley 80 over which a belt 81 is trained and connected to a pulley 82 mounted on shaft 83 which is journaled in bearings in frame F IV. The cutter driving mechanism also includes a bevel gear 84 on shaft 83 which meshes with and turns bevel gear 85 secured to the rotary cutter 86, the two being bolted together and mounted on pin 87 mounted in bearings in frame F IV. Of course, a short shaft may be substituted for pin 87, if desired. The length of pin 87 is such that the rotary cutter 86 is positioned just sufficiently below the belts 32, 32' to effectively top the beets which hang normally below the belts and which are adjusted to a cutting or topping position by the chains 74, 74' operating below the belts. See, for example, the showing in Figures 3 and 4 of the drawings.

As disclosed in my aforementioned co-pending application, the beets topped by the cutter are dropped into an elevator which conveys the beets to the top and rear of the vehicle and discharges them into a hopper. A similar elevator is disclosed herein which is driven from the rear axle 3 of the vehicle through gearing and chain drive which first drives gearing on pin 6. A sprocket wheel 88 is movably mounted on pin 6 and bolted to the other sprocket wheels mounted thereon. The sprocket wheel 88 drives, by means of chain 89, a sprocket wheel 90 on shaft 91 which is journaled in bearings in brackets 95, 95' secured to frame F I. A gear wheel 92 on shaft 91 turns a gear wheel 93 on shaft 94 which also is journaled in bearings on brackets 95, 95'. See, in this connection, Figures 8 and 9 of the drawings. A pair of sprocket wheels 96, 96' are secured to shaft 94 and two elevator chains 97, 97' are trained around the wheels 96, 96' as well as top sprocket wheels 98, 98' on shaft 99 which is journaled in bearings in a bracket secured to the beet topper, see Figure 1 of the drawings.

In order to provide clearance for the rear end of frame F II when the same is lowered to place the frame in a non-working position, the frame work of the beet elevator is curved as shown in Figure 1 and the chains 97, 97' are sufficiently long to become slackened and thereby afford room for the frame F II.

The mechanism for automatically opening and closing the hopper door to discharge the topped beets during the advance of the vehicle is more completely described in my above mentioned copending application. It is sufficient to state here that the shaft 99 carries a bevel gear wheel 100 which meshes with bevel gear 101 carried on a stub shaft 102 which is journaled in bearings in the aforementioned bracket on the beet hopper. A sprocket wheel 103 on shaft 102 turns a wheel on the hopper, through chain 103A, which in turn actuates the mechanism for automatically closing of hopper doors after they have been opened by the weight of the beets thereon.

Figure 7:
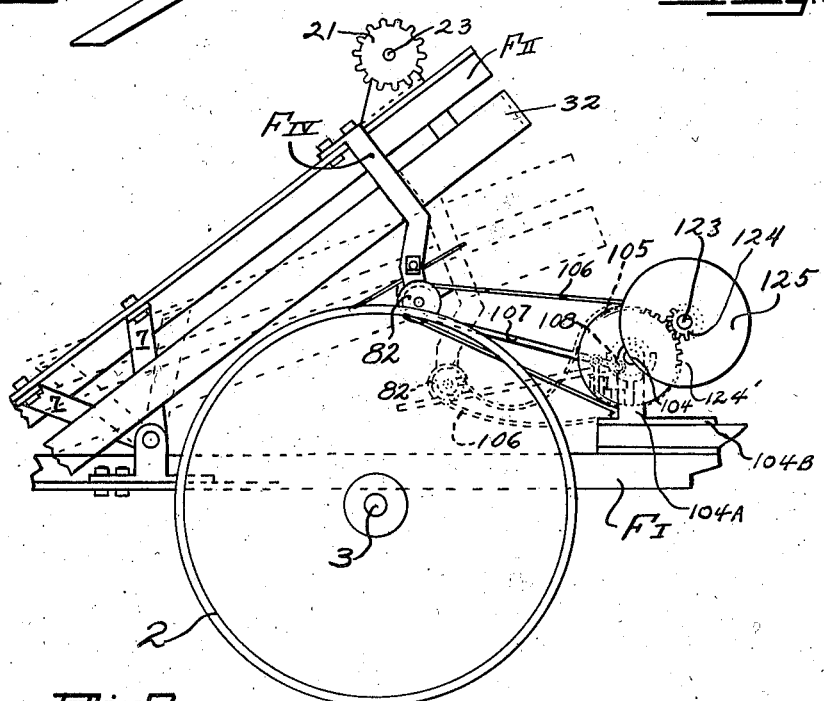
Figure 7 is a side elevational view of the rear portions of the main and movable frames of the machine and illustrating in full and dotted lines the working and non-working positions of the movable frame. This view also illustrates alternate drive mechanism for the beet cutter.

The alternate means that I have provided for driving the rotary cutter 86, when propelling the vehicle by an engine, preferably includes either a belt or a chain drive. The alternate mechanism is clearly shown in Figures 7 and 10 to 12 inclusive and conveniently includes a shaft 104 suitably journaled in uprights 104A on a base 104B which is supported on frame F I, see Figure 7 of the drawings. Slidably mounted on the shaft 104 is a pulley 105 which is placed in driving connection by means of a belt 106 with a pulley 82 on shaft 83. In lowering the rear of frame F II to place the same in a non-working position, the distance between shafts 83 and 104 is decreased causing a slackening of the belt 106, see Figure 7 of the drawings. To prevent the belt 106 from slipping from the pulleys 82 and 105, I provide a cover plate 106A for the belt which is bolted to frame F IV, see Figure 12 of the drawings. In addition to the foregoing, I provide a lever 107 which is pivotally mounted by pin 108 in bracket 108A at one end thereof and which slides through and is supported by a ring 109, provided on the under side of frame F IV, at its other end, when the frame F II is lowered. The lever 107 is connected by means of a link 110 to an arm 111 on rod 112 which also is movably mounted on bracket 108A. A collar 113 is fastened to the slidably mounted pulley 105 on shaft 104 and is engaged by a bifurcated arm 114 on rod 112. I also provide a clutch consisting of a male member 115 and a female member 115A, the member 115 being slidably mounted in the keyway 116 which is formed on side of the pulley 105, and the female member 115A being rigidly secured to the shaft 104. A spring 117 is interposed between the pulley 105 and the male member 115 of the clutch to facilitate engagement of the clutch member. The shaft 104 is driven by the crankshaft 123 of the engine, which is supported on the base 104B, and to this end a pinion 124 on shaft 123 is caused to mesh with a gear 124' on shaft 104. The flywheel of the engine is indicated by the reference character 125.

It will be understood from a review of the accompanying drawings that beets which are topped by the rotary cutter fall into the beet elevator and are carried up to the top of the hopper 118 and dropped therein. The topped beets subsequently are discharged from the hopper to the side of the vehicle as it progresses across the field. The beet leaves fall into a chute 119 and are dumped therefrom at the rear of the vehicle.

Adjacent to the right rear of the vehicle I provide an operator's seat 120 which is placed, of course, in close proximity to the steering wheel 121 on steering post 122 which connects with conventional steering mechanism associated with the front axle of the vehicle. In addition to the linkage connecting hand-lever 14 to the frame F II for raising and lowering the same, I provide additional linkage connecting hand lever 14 with a clutch on the rear axle for engaging and disengaging the beet conveying and beet topping mechanism. This linkage includes a link 126 which connects hand-lever 14 with L-arm 127 mounted on frame F I, the L-arm 127 being fastened to connecting rod 128 which is connected to lever 129 for actuating the clutch 130 mounted on rear axle 3. An additional hand lever 131, adjacent the driver's seat 120, is provided for actuating mechanism, not shown, to swing the hopper bottom from one side to the other to discharge beets at either side of the vehicle.

While I have shown the preferred embodiment of my improved beet topping machine in the accompanying drawings, it is to be understood that I am not to be limited to the embodiment illustrated as the invention, as defined in the appended claims, can be embodied in a plurality and variety of forms without departing from the scope of the invention.

I claim:

1. A beet topping machine comprising a vehicle adapted to advance over a field of beets, a rigid frame on said vehicle, a second frame movably mounted as shown and specified on said rigid frame; said second frame being adapted to be moved from a working to a non-working position and vice-versa, a pair of plows mounted on the forward end of said second frame, for severing beets from the soil during the advance of the vehicle and for lifting the beets onto said vehicle, means for giving an additional lift to said plows upon the movement of said second frame to a non-working position to provide a greater clearance of said plows from the ground during progress of said vehicle when not engaged in topping operations, a first conveyor on said second frame for gripping the leaves of the beets and for conveying the beets rearwardly on said vehicle in a predetermined path, means for driving said first conveyor during the advance of the vehicle, a cutter mounted on said second frame remote from the path of said first conveyor, means for actuating said cutter during the advance of said vehicle, a second conveyor operating in a path diverging from the path of said first conveyor and terminating adjacent said cutter; said second conveyor being adapted to grip the leaves of the beets more closely to the tops of the beets than said first conveyor and to position the beets for the topping operation by the cutter, a pair of rollers pivotally mounted adjacent said cutter, flanges on said rollers overlying portions of said second conveyor; said flanges serving to hold said second conveyor against displacement and thus to steady the beets for the topping operation and insuring uniformity in topping, and means for driving said second conveyor at the same speed as the driving speed of said first conveyor.

2. In a machine for topping beets, in combination, a rigid frame, a second frame movably mounted on said rigid frame, a pair of belts on said second frame for gripping the leaves of the beets, to lift the beets from the soil and for conveying the beets in a predetermined path, a first pair of sprocket wheels revolvably supported on said second frame close to said belts; said sprocket wheels being disposed with their axes approximately parallel to the faces of said belts, a second pair of sprocket wheels revolvably supported on said second frame remote from the path of said belts; said second pair of sprocket wheels being disposed with their axes approximately parallel to the faces of said belts, a pair of chains trained around said sprocket wheels to provide conveyors diverging from said predetermined path, a cutter movably supported on said second frame remote from said predetermined path and adjacent to the path of said chains; said cutter being disposed with its axis at right angles to the paths of said chains, means for actuating said cutter, a pair of rollers pivotally mounted adjacent each sprocket wheel of said second pair of sprocket wheels; said rollers being smaller in diameter than the diameters of said sprocket wheels, a flange on each of said rollers overlying the tops of said chains whereby said chains are constrained against displacement by reason of the lifting force of said belts in gripping the beet tops and thus steadying the beets for the topping operation, and means for driving said belts and said chains at the same speeds.

3. In a beet topping machine of the character defined in claim 2, shields secured to said second frame and partially encompassing said belts to keep said belts free from the soil.

JOSEF FECHTNER.